J. C. PEDRICK.
BALL CASTER.

No. 25,138. Patented Aug. 16, 1859.

Witnesses:
Lemuel W. Serrell
Charles Smith

Inventor.
John C. Pedrick

UNITED STATES PATENT OFFICE.

JOHN C. PEDRICK, OF WASHINGTON, DISTRICT OF COLUMBIA.

BALL FURNITURE-CASTER.

Specification of Letters Patent No. 25,138, dated August 16, 1859.

*To all whom it may concern:*

Be it known that I, JOHN C. PEDRICK, of Washington, in the District of Columbia, have invented a certain new and useful Improvement in Ball-Casters; and I do hereby declare that the following is a full, clear, and exact description of the construction and operation of the same, reference being had to the annexed drawing, making part of this specification, wherein—

Figure 3:
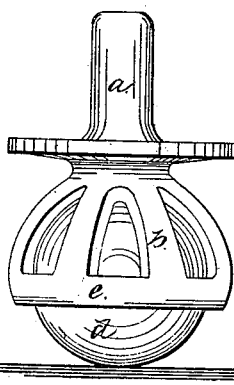
Figure 2:
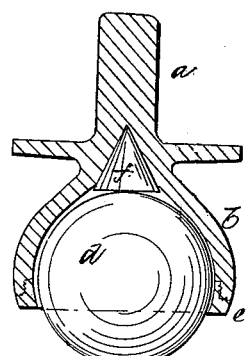
Figure 1:
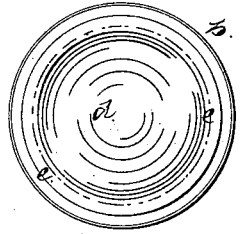

Figure 1 is an inverted plan of my caster. Fig. 2 is a vertical section, and Fig. 3 is a side elevation.

Similar marks of reference denote the same parts.

In the construction of ball casters it has been usual heretofore to insert a ball within a cup, or else attach the same by center points or a spindle. In the first instance the extent of metallic surfaces coming in contact prevented the ball rolling freely; in the latter instance the ball would only roll in one direction unless attached by a vertical pivot or turning pin.

The nature of my said invention therefore does not consist in a ball and cup caster, but in the insertion in such cup of an anti friction bearing surface or surfaces for the independent ball to roll against in any direction; and for this bearing I introduce agate, or other anti-friction material into the cup immediately over the ball, so that the bearing thereof is rendered smooth and true and the friction avoided, at the same time bearings of agate or similar material may be inserted within the cup around the sides of the ball.

In the drawing $a$, is a socket entering the table or chair leg or otherwise connected thereto; $b$, is a solid or openwork cup formed with the socket $a$, receiving the ball $d$, that is made of glass or similar mineral substance, and is perfectly spherical. The ball $d$, may be retained in the cup by the ring $e$, screwed or otherwise attached to the cup $b$, after the ball is in place, or any similar device may be used for this purpose.

$f$ is a conical piece of agate or similar material inserted into the cup $b$, in such a manner that the weight rests on the ball through this agate surface or bearing in such a manner that the anti friction bearing thereby produced on the ball by the agate or other material allows the ball to revolve while rolling over the carpet or other character of floor: and my glass balls are more durable and smoother than metal balls, rendering them especially adapted to this purpose.

As before set forth I do not claim a ball and socket caster, but

What I claim as my invention and desire to secure by Letters Patent is—

Inserting into a metal cup containing the ball of a caster, a separate anti friction bearing $f$, against which the ball revolves, thereby lessening the friction of the ball in the metal cup or socket as specified.

In witness whereof I have hereunto set my signature this twenty third day of July 1859.

JOHN C. PEDRICK.

Witnesses:
LEMUEL W. SERRELL,
CHAS. H. SMITH.